(12) United States Patent
Nomoto et al.

(10) Patent No.: US 9,245,206 B2
(45) Date of Patent: Jan. 26, 2016

(54) IMAGE PROCESSING APPARATUS AND IMAGE PROCESSING METHOD

(71) Applicant: CANON KABUSHIKI KAISHA, Tokyo (JP)

(72) Inventors: Atsuo Nomoto, Tokyo (JP); Kotaro Yano, Tokyo (JP); Yuji Kaneda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/686,429

(22) Filed: Nov. 27, 2012

(65) Prior Publication Data

US 2013/0142401 A1   Jun. 6, 2013

(30) Foreign Application Priority Data

Dec. 5, 2011   (JP) .................. 2011-266278

(51) Int. Cl.
*G06K 9/00* (2006.01)
*G06K 9/62* (2006.01)

(52) U.S. Cl.
CPC .......... *G06K 9/6267* (2013.01); *G06K 9/00288* (2013.01); *G06K 9/6232* (2013.01); *G06K 9/00* (2013.01)

(58) Field of Classification Search
CPC .......... G06K 9/00268; G06K 9/00288; G06K 9/00302; G06K 9/6267; G06K 9/00456; G06K 9/6218
USPC ......... 382/118, 190, 224, 103, 156, 195, 217, 382/243, 266; 345/629
See application file for complete search history.

(56) References Cited

U.S. PATENT DOCUMENTS

| | | | | |
|---|---|---|---|---|
| 5,309,228 A | * | 5/1994 | Nakamura | G03B 27/735 355/40 |
| 5,787,186 A | * | 7/1998 | Schroeder | G06K 9/00221 235/380 |
| 5,818,457 A | | 10/1998 | Murata et al. | |
| 6,246,779 B1 | * | 6/2001 | Fukui | G06K 9/00268 382/100 |
| 6,463,176 B1 | | 10/2002 | Matsugu et al. | |
| 6,774,917 B1 | * | 8/2004 | Foote | G06F 17/30814 707/E17.028 |

(Continued)

FOREIGN PATENT DOCUMENTS

| | | |
|---|---|---|
| JP | 6-333023 A | 12/1994 |
| JP | 3078166 B2 | 8/2000 |

(Continued)

OTHER PUBLICATIONS

U.S. Appl. No. 13/683,409, filed Nov. 21, 2012. Applicants: Kaneda et al.

(Continued)

*Primary Examiner* — Vu Le
*Assistant Examiner* — Aklilu Woldemariam
(74) *Attorney, Agent, or Firm* — Fitzpatrick, Cella, Harper & Scinto

(57) ABSTRACT

The image processing apparatus detects a region of a subject from an input image, and extracts an image feature amount from the region. Also, the apparatus classifies the subject into any one of plural attributes based on the image feature amount, and estimates, based on the image feature amount and an attribute into which it is classified, an attribute value of the subject belonging to the attribute into which it is classified.

8 Claims, 8 Drawing Sheets

(56) References Cited

U.S. PATENT DOCUMENTS

| | | | | |
|---|---|---|---|---|
| 6,944,319 | B1* | 9/2005 | Huang | G06K 9/6282 382/118 |
| 6,961,466 | B2* | 11/2005 | Imagawa | G06K 9/00228 382/190 |
| 7,171,025 | B2* | 1/2007 | Rui | G06K 9/00234 348/597 |
| 7,369,686 | B2* | 5/2008 | Yokono | G06K 9/00221 382/118 |
| 7,436,988 | B2* | 10/2008 | Zhang | G06K 9/00268 382/118 |
| 7,593,551 | B2* | 9/2009 | Kamei | G06K 9/00268 382/118 |
| 7,699,423 | B2 | 4/2010 | Suwa et al. | |
| 7,881,524 | B2 | 2/2011 | Matsugu et al. | |
| 8,130,281 | B2 | 3/2012 | Kaneda et al. | |
| 8,331,655 | B2 | 12/2012 | Sato et al. | |
| 8,463,045 | B2* | 6/2013 | Yang | G06F 17/30256 382/190 |
| 2002/0038294 | A1 | 3/2002 | Matsugu | |
| 2003/0044073 | A1* | 3/2003 | Matsugu | G06K 9/00268 382/195 |
| 2004/0197013 | A1* | 10/2004 | Kamei | G06K 9/00268 382/118 |
| 2005/0147292 | A1* | 7/2005 | Huang | G06K 9/00228 382/159 |
| 2006/0115157 | A1 | 6/2006 | Mori et al. | |
| 2006/0140455 | A1* | 6/2006 | Costache | G06F 17/30259 382/118 |
| 2007/0127786 | A1* | 6/2007 | Hiraizumi | G06K 9/00268 382/118 |
| 2007/0171237 | A1* | 7/2007 | Pinter | G06T 11/60 345/629 |
| 2007/0196019 | A1* | 8/2007 | Yamaguchi | G06K 9/6292 382/224 |
| 2007/0239764 | A1* | 10/2007 | Song | G06F 17/30247 |
| 2008/0037837 | A1* | 2/2008 | Noguchi | G06K 9/00335 382/118 |
| 2008/0219516 | A1* | 9/2008 | Suzuki | G06K 9/00228 382/118 |
| 2008/0310727 | A1* | 12/2008 | Wu | G06F 17/3079 382/190 |
| 2009/0028393 | A1* | 1/2009 | Kim | G06F 17/30601 382/118 |
| 2009/0041340 | A1* | 2/2009 | Suzuki | G06K 9/00288 382/159 |
| 2009/0074304 | A1* | 3/2009 | Momosaki | G06F 17/30787 382/224 |
| 2009/0089235 | A1 | 4/2009 | Torii et al. | |
| 2009/0169065 | A1* | 7/2009 | Wang | G06K 9/00268 382/118 |
| 2009/0220156 | A1* | 9/2009 | Ito | G06K 9/00248 382/201 |
| 2010/0202707 | A1* | 8/2010 | Costache | G06F 17/30259 382/224 |
| 2010/0239154 | A1* | 9/2010 | Fujimori | G06K 9/4614 382/141 |
| 2010/0260406 | A1* | 10/2010 | Sammak | G06K 9/00127 382/133 |
| 2012/0033853 | A1 | 2/2012 | Kaneda et al. | |
| 2012/0063639 | A1 | 3/2012 | Yano | |
| 2012/0092495 | A1 | 4/2012 | Yano | |
| 2012/0148159 | A1 | 6/2012 | Kaneda et al. | |
| 2012/0269405 | A1 | 10/2012 | Kaneda et al. | |
| 2012/0288148 | A1 | 11/2012 | Suzuki et al. | |
| 2012/0288152 | A1 | 11/2012 | Yano | |

FOREIGN PATENT DOCUMENTS

| | | |
|---|---|---|
| JP | 2002-008032 A | 1/2002 |
| JP | 2007-226512 A | 9/2007 |

OTHER PUBLICATIONS

U.S. Appl. No. 13/604,362, filed Sep. 5, 2012. Applicants: Sagawa et al.

Li et al., "Support Vector machine based multi-view face detection and recognition", Image and Vision Computing, vol. 22, No. 5, 2004, pp. 413-427.

Murphy-Chutorian et al., "Head Pose Estimation for Driver Assistance Systems: A Robust Algorithm and Experimental Evaluation", Proc. IEEE Conf. Intelligent Transportation Systems Conference, 2007, pp. 709-714.

N. Dalal and B. Triggs, "Histograms of Oriented Gradients for Human Detection", Conf. on Computer Vision and Pattern Recognition CPVR, 2005.

* cited by examiner

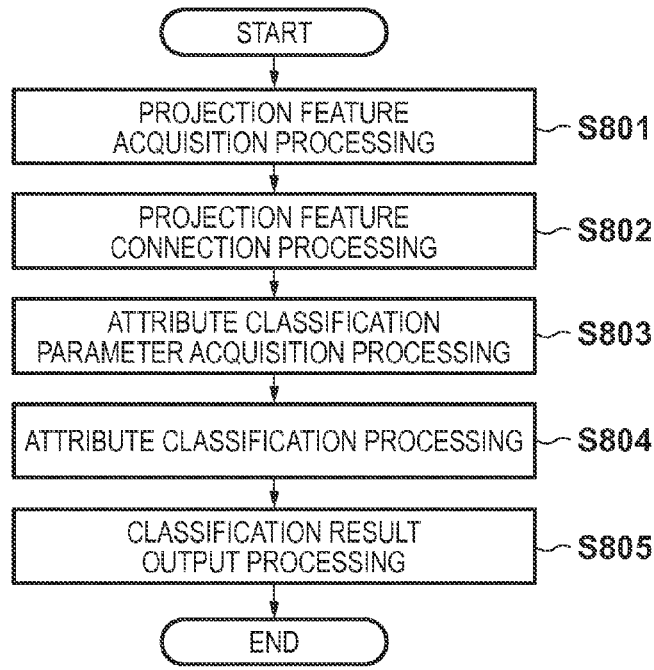
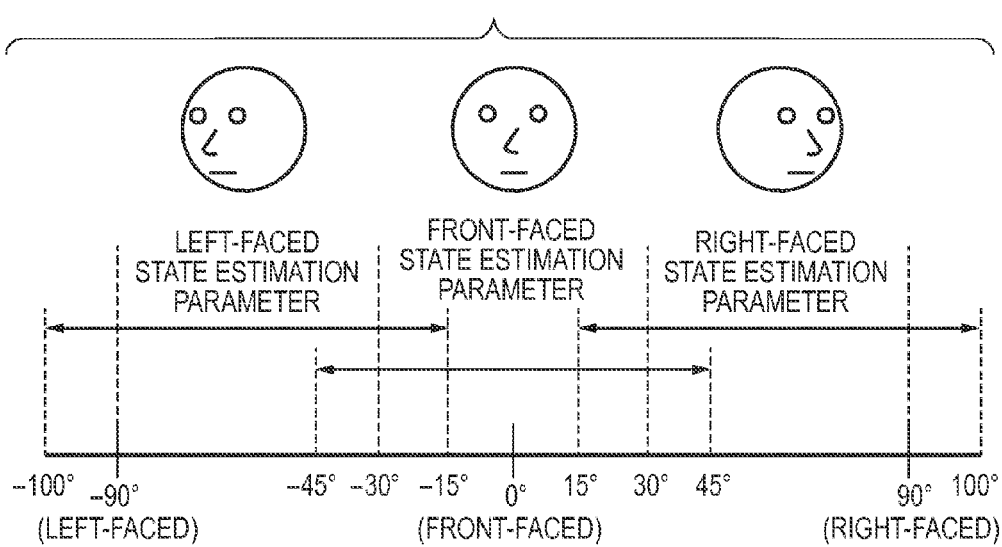

IMAGE PROCESSING APPARATUS AND IMAGE PROCESSING METHOD

BACKGROUND OF THE INVENTION

1. Field of the Invention

The present invention relates to a technique for estimating an attribute of an object included in an image.

2. Description of the Related Art

In recent years, object attribute estimation techniques for estimating an attribute of an object (to be referred to as an object attribute hereinafter) in an image have been extensively developed. Of these techniques, a face direction estimation technique estimates a direction of a human face in an image, and is an example of the object attribute estimation technique having a human face as an object and its direction as an attribute. In this manner, since human face direction information in an image can be automatically acquired, this technique has broad use ranges such as semantic understanding or composition estimation of an image and device control according to a human face direction.

As a typical method of face direction estimation, a method of preparing a plurality of face detectors dedicated to faces in specific directions are prepared, and estimating a face direction by integrating outputs from the respective face detectors is known (Japanese Patent Laid-Open No. 2007-226512). The face detector dedicated to a face in a specific direction is implemented by preparing in advance a large number of images including human faces whose face direction angles fall within a specific range (to be referred to as a face direction range hereinafter), and learning those images by a machine learning method. This method has a merit of estimating a face direction simultaneously with face detection. However, since the number of face detectors has to be increased to enhance the estimation resolution, each of a plurality of face detectors requires a dictionary file, and a total size of these dictionary files becomes huge, resulting in a demerit. Individual face detectors are independent detectors, and have no relevance between their output values. Hence, even when their output values are integrated, estimation cannot always be made at high accuracy.

On the other hand, a method of estimating a face direction angle value by extracting a feature amount from a face image, and inputting the feature amount to a recursive function (estimation model) has been proposed. This method allows angle estimation at a high resolution by learning the recursive function using learning data prepared by associating face images and their face direction angle values with each other. As an example of face direction estimation using the recursive function, a technique disclosed in non-patent literature 1 (Y. Li, S. Gong, J. Sherrah, and H. Liddell, "Support vector machine based multi-view face direction and recognition," Image and Vision Computing, vol. 22, no. 5, p. 2004, 2004.) is available. The technique disclosed in non-patent literature 1 estimates a face direction by inputting projected features, which are obtained by projecting a feature amount extracted from a face image onto an eigenspace base prepared in advance, in a Support Vector Regression (SVR). By projecting a feature amount onto the eigenspace, not only a dimension reduction effect of a feature amount but also an effect of eliminating the influence of noise derived from a change in illumination condition of a face image can be expected. The eigenspace is obtained by learning a large number of face images of a face direction range to be estimated, which are prepared in advance. Using nonlinear kernels in the SVR, a recursive function which expresses in detail a feature space having a complicated, nonlinear structure, and maps on a face direction angle, can be configured.

In a technique disclosed in non-patent literature 2 (Erik Murphy-Churtorian, "Head pose estimation for driver assistance systems: A robust algorithm and experimental evaluation," in Proc. IEEE Conf. Intelligent Transportation Systems, 2007, pp. 709-714.), an HOG (Histogram of Oriented Gradient) is extracted as a feature amount, and a face direction is estimated using the SVR. The HOG corresponds to feature mounts obtained by converting pieces of luminance gradient information of an image into a histogram for respective regions of the image, and is known as a feature amount robust against local noise and densities of an image. By selecting a feature amount robust against variations which are not related to a face direction, stable face direction estimation can be implemented even in an actual environment.

A technique disclosed in Japanese Patent Laid-Open No. 6-333023 estimates an age of a face by inputting a feature amount extracted from a face image in a neural network which is learned in advance. In this manner, an attribute other than the face direction can be estimated using the machine learning method.

However, these methods suffer a problem of an estimation accuracy drop when a face image having a broad face direction range and including noise in an actual environment like a general photo is input. In the actual environment, since the face direction has no limitation, a broad face direction range includes face directions from a full-face direction to a half-face direction, and an appearance of an image according to that angle change largely changes. In addition, there are a large number of factors (noise components) (for example, various illumination conditions such as direct sunlight, indoor illumination, and the like, personal differences of head shapes, various expressions on faces, and the like), which largely change the appearance in addition to the face direction. In such case, for the method of estimating a face direction from projected features using the single eigenspace like in non-patent literature 1, and the simple estimation model using only a feature amount robust against noise like in non-patent literature 2, it is difficult to attain face direction estimation. This is because since a face direction and a change in appearance caused by other factors overlap each other, a range that can be expressed by a single feature amount is exceeded, and an estimator cannot discriminate an appearance difference based on a face direction.

SUMMARY OF THE INVENTION

The present invention has been made in consideration of the aforementioned problems, and provides a technique for attaining accurate attribute estimation over a broad range even in an actual environment.

According to one aspect of the present invention, there is provided an image processing apparatus comprising: a detection unit configured to detect a region of a subject from an input image; an extraction unit configured to extract an image feature amount from the region; a classification unit configured to classify the subject into any one of plural attributes based on the image feature amount; and an estimation unit configured to estimate, based on the image feature amount and an attribute into which the classification unit classifies, an attribute value of the subject belonging to the attribute into which the classification unit classifies.

According to another aspect of the present invention, there is provided an image processing method comprising: a detection step of detecting a region of a subject from an input image; an extraction step of extracting an image feature amount from the region; a classification step of classifying the subject into any one of plural attributes based on the image feature amount; and an estimation step of estimating, based on the image feature amount and an attribute into which it is classified in the classification step, an attribute value of the subject belonging to the attribute into which it is classified in the classification step.

Further features of the present invention will become apparent from the following description of exemplary embodiments with reference to the attached drawings.

BRIEF DESCRIPTION OF THE DRAWINGS

FIG. 8 is a flowchart of processing to be executed by an attribute classification processing unit 36;

FIG. 9 is a view showing an example of face direction ranges of face images used to learn an SVR;

DESCRIPTION OF THE EMBODIMENTS

Embodiments of the present invention will be described hereinafter with reference to the accompanying drawings. Note that an embodiment to be described hereinafter is an example when the present invention is practically carried out, and is one of practical embodiments of the arrangements described in the scope of claims.

[First Embodiment]

Figure 2:
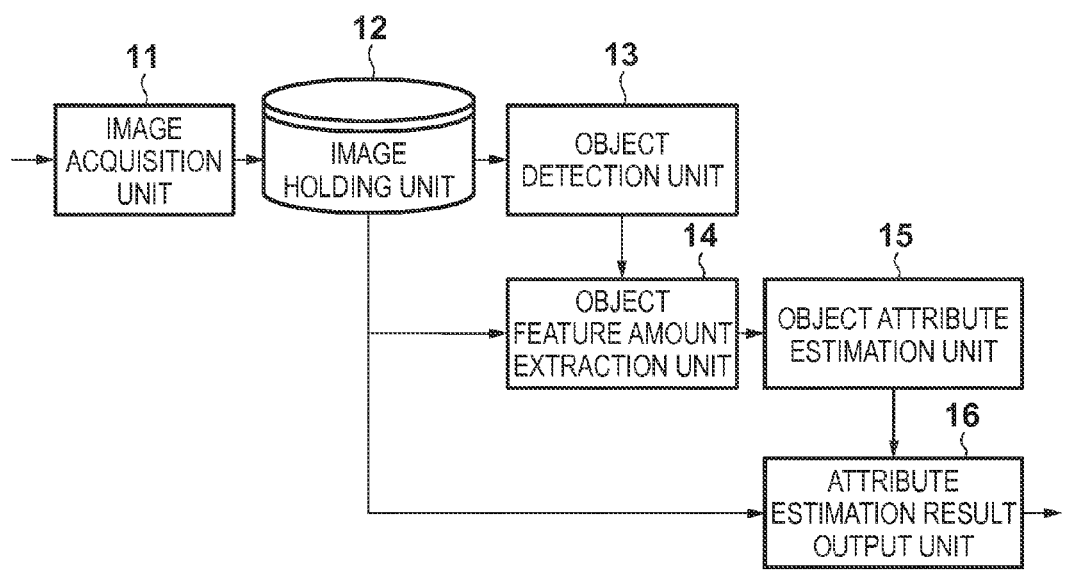
FIG. 2 is a block diagram showing an example of the functional arrangement of an image processing apparatus.

An example of the functional arrangement of an image processing apparatus according to this embodiment will be described first with reference to the block diagram shown in FIG. 2. Note that respective units shown in FIG. 2 need not always be included in a single apparatus. For example, a component such as an image holding unit 12 which functions as a memory may be implemented as an external device of the image processing apparatus.

An image acquisition unit 11 acquires an image including a subject as an object. An acquisition source is not limited to a specific acquisition source. For example, an image may be acquired (received) from an external apparatus via a network such as the Internet, or may be acquired by reading it out from a memory in the image processing apparatus.

An image holding unit 12 temporarily stores an image acquired by the image acquisition unit 11, and outputs, at prescribed timings, the stored image to request sources in response to requests from an object detection unit 13, object feature amount extraction unit 14, and attribute estimation result output unit 16.

The object detection unit 13 applies known subject detection processing to the image received from the image holding unit 12, thereby detecting a subject region from the image. Then, the object detection unit 13 outputs region information indicating the detected subject region to the object feature amount extraction unit 14. This region information can be arbitrary information as long as a region of a subject in an image can be specified. For example, a coordinate position of an upper left corner and that of a lower right corner of a rectangular region which surrounds a region including a subject may be used as the region information. Alternatively, the coordinate position of the rectangular region, and vertical and horizontal sizes of the region may be used as the region information.

The object feature amount extraction unit 14 extracts the subject region from the image received from the image holding unit 12 using the region information received from the object detection unit 13, and extracts an image feature amount from the extracted region. Then, the object feature amount extraction unit 14 outputs this extracted image feature amount to an object attribute estimation unit 15.

The object attribute estimation unit 15 estimates a state of a subject in the image using the image feature amount received from the object feature amount extraction unit 14. Then, the object attribute estimation unit 15 notifies the attribute estimation result output unit 16 of this estimated state.

The attribute estimation result output unit 16 outputs the image stored in the image holding unit 12 and information indicating the state notified from the object attribute estimation unit 15. This output destination is not limited to a specific output destination.

Figure 3:
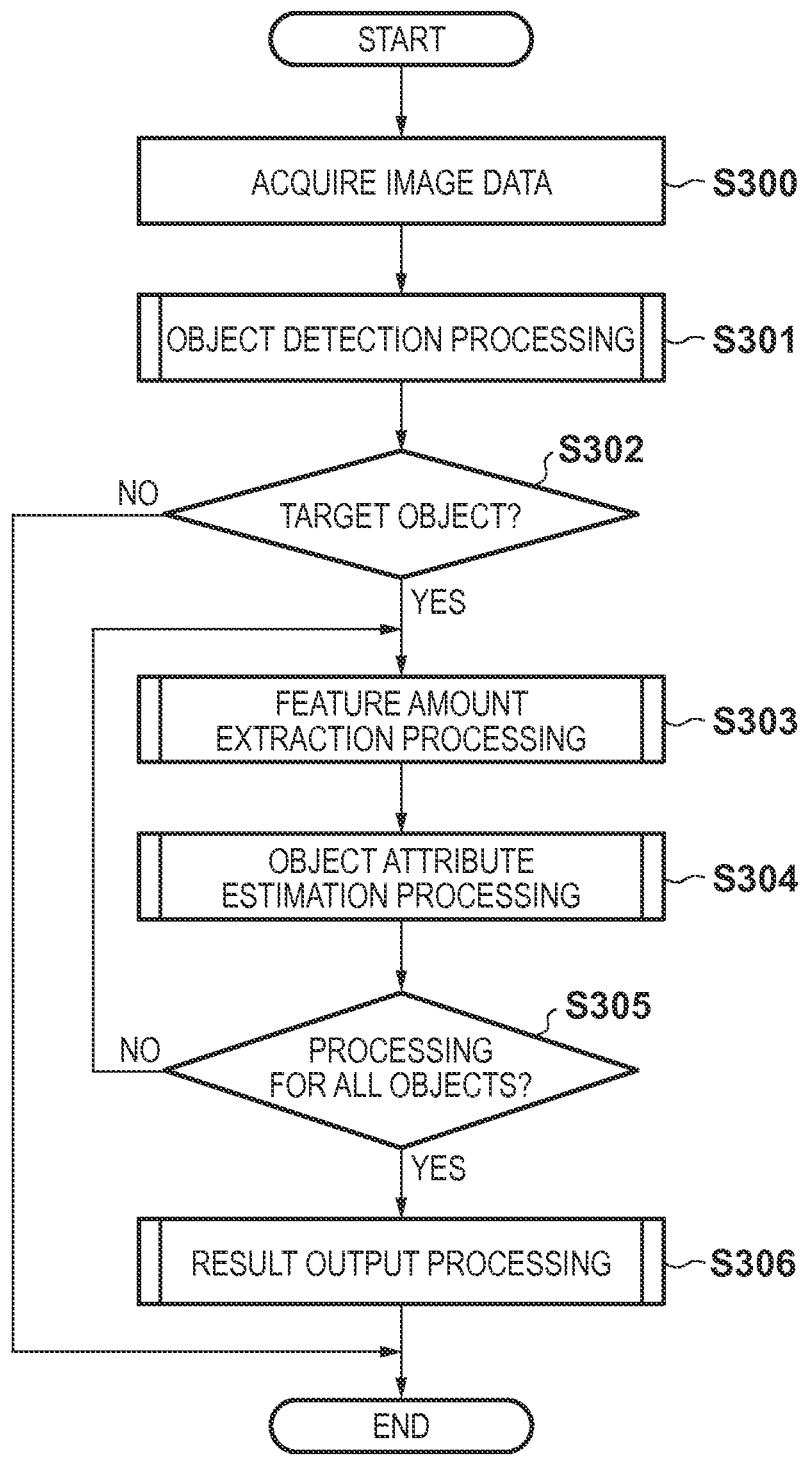
FIG. 3 is a flowchart of processing to be executed by the image processing apparatus.

Processing to be executed by the image processing apparatus according to this embodiment will be described below with reference to FIG. 3 which shows the flowchart of that processing. Note that the following description will be given taking a practical example for the sake of easy understanding. In this practical example, a human face is used as a subject, and in which of right and left pan directions the face directs (classification of an attribute) and an angle of the face in that direction (estimation of an attribute value) are estimated.

In step S300, the image acquisition unit 11 acquires an image including a human face (estimation target subject), and stored the acquired image in the image holding unit 12.

In step S301, the object detection unit 13 detects human faces from the image stored in the image holding unit 12. As the method of detecting a human face from an image, for example, known techniques described in Japanese Patent No. 3078166, Japanese Patent Laid-Open No. 2002-8032, and the like can be used. Then, the object detection unit 13 generates region information of a detected region, and outputs the generated region information to the object feature amount extraction unit 14. Note that this region information may include image coordinates of the two eyes.

Note that if the object detection unit 13 fails to detect a human face from the image, the process ends via step S302. On the other hand, if the object detection unit 13 successfully detects human faces, the process advances to step S303 via step S302.

In step S303, the object feature amount extraction unit 14 extracts a human face region from the image received from the image holding unit 12 using the region information received from the object detection unit 13, and extracts an image feature amount from the extracted region. Details of the processing in step S303 will be described later.

In step S304, using the image feature amount received from the object feature amount extraction unit 14, the object attribute estimation unit 15 estimates, as a state of a human face in the image (attribute), a direction of the face (one of front, right, and left directions in right and left pan directions). Furthermore, the object attribute estimation unit 15 estimates, as another state (attribute value) of the face in this estimated state, an angle value of the face in the right and left pan directions. Then, the object attribute estimation unit 15 notifies the attribute estimation result output unit 16 of this estimated angle value. Details of the processing in step S304 will be described later.

The processes in steps S303 and S304 are applied to all faces detected in step S301. Therefore, after the processes in steps S303 and S304 are complete for all the faces detected in step S301, the process advances to step S306 via step S305. On the other hand, if faces to be processed in steps S303 and S304 still remain, the process returns to step S303 via step S305.

In step S306, the attribute estimation result output unit 16 outputs the image stored in the image holding unit 12 and the angle values of the respective faces notified from the object attribute estimation unit 15. Note that this angle value may be output as a face direction class obtained by mapping the angle value on a class for each predetermined face direction range.

Assume that a feature amount of each face in an image may be calculated in advance, and may be stored in a memory or the like. In this case, the flowchart shown in FIG. 3 may be started from step S304. That is, the process of step S304 is applied to all the faces, and that of step S306 is then executed.

Figure 4:
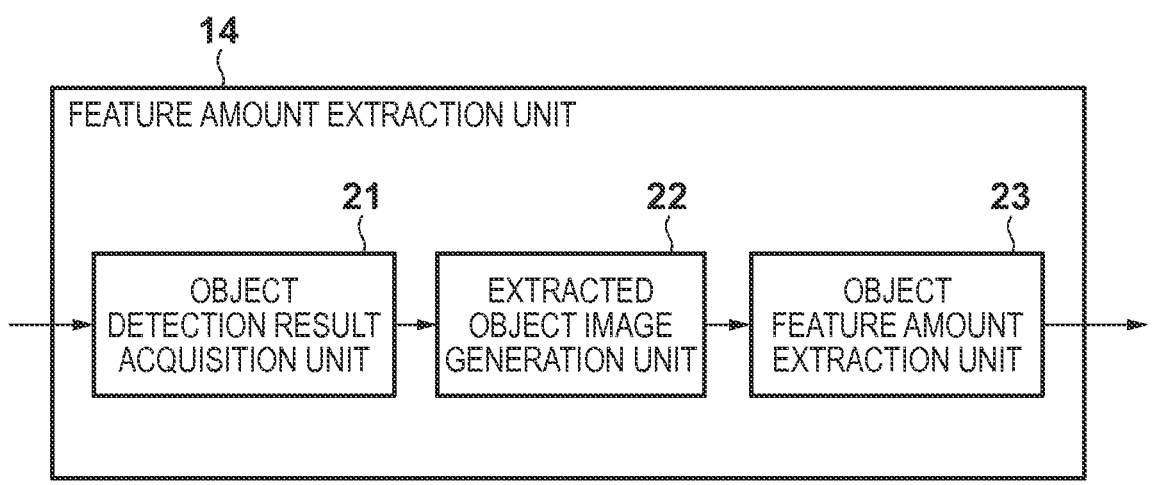
FIG. 4 is a block diagram showing an example of the functional arrangement of an object feature amount extraction unit 14.

Details of the processing in step S303 will be described below. An example of the functional arrangement of the object feature amount extraction unit 14 will be described below with reference to the block diagram shown in FIG. 4.

An object detection result acquisition unit 21 acquires the image from the image holding unit 12, and also the region information from the object detection unit 13, and outputs the acquired image and region information to a subsequent extracted object image generation unit 22.

The extracted object image generation unit 22 extracts (clips) a human face region from the image received from the object detection result acquisition unit 21 using the region information received from the object detection result acquisition unit 21. When the region information includes image coordinates of the two eyes of the face, the image may be rotated so that a line connecting the two eyes is parallel to the horizontal axis of the image, thereby correcting a tilt of the face with respect to the image plane (a tilt of an image in-plane direction). Also, the image may be enlarged/reduced so that a length of a line segment which connects the two eyes becomes the predetermined number of pixels, thereby normalizing the size of the region (face region) to be extracted.

An object feature amount extraction unit 23 extracts an image feature amount from the region extracted (clipped) by the extracted object image generation unit 22. In this embodiment, a gradient direction histogram feature amount is used as the image feature amount to be extracted, but any other image feature amount may be used. The extraction method of the gradient direction histogram feature amount is as follows.

Letting I(x, y) be a pixel value (luminance value) of a pixel at a coordinate position (x, y) in the image, a luminance gradient in the X direction can be calculated by:

$$f_x(x,y) = I(x+1,y) - I(x-1,y) \quad (1)$$

Also, a luminance gradient in the Y direction can be calculated by:

$$f_y(x,y) = I(x,y+1) - I(x,y-1) \quad (2)$$

From the luminance gradients in the X and Y directions, a gradient magnitude m(x, y) can be calculated by:

$$m(x,y) = \sqrt{f_x(x,y)^2 + f_y(x,y)^2} \quad (3)$$

From the luminance gradients in the X and Y directions, a gradient direction θ(x, y) can be calculated by:

$$\theta(x, y) = \tan^{-1} \frac{f_y(x, y)}{f_x(x, y)} \quad (4)$$

Then, respective intervals obtained by dividing a gradient direction range of 180° at 20°-intervals into nine are defined as bins, and frequency histograms of the gradient directions θ are generated for respective rectangular regions obtained by dividing the image into a plurality of rectangular regions (cells). Using nine (=3×3) cells as one block, normalization is executed for respective blocks. Normalization is applied to the entire region while shifting a cell of interest one by one, and histograms are connected every time the normalization is applied. A connected histogram obtained by applying this processing to the entire image is the gradient direction histogram feature amount.

In this manner, the normalization for each block is normally applied while shifting a cell of interest one by one. In this case, by increasing a shift amount, a calculation amount and the number of dimensions of the feature amount may be reduced. This feature amount is not invariable with respect to a rotation and scale change of an object in the image, but it is known as a feature amount which is invariable with a local geometric change and brightness change. Note that as for details of the gradient direction histogram feature amount, please refer to "N. Dalal and B. Triggs. Histograms of oriented gradients for human detection. Conference on Computer Vision and Pattern Recognition (CVPR), 2005."

In this embodiment, the image feature amount is extracted from an image (clipped object image) within the region specified by the region information received from the object detection result acquisition unit 21. This extracted image feature amount is output to the subsequent object attribute estimation unit 15. However, image feature amounts for a plurality of regions may be held in advance, and an image feature amount for a requested region may be output to the object attribute estimation unit 15.

Figure 5:
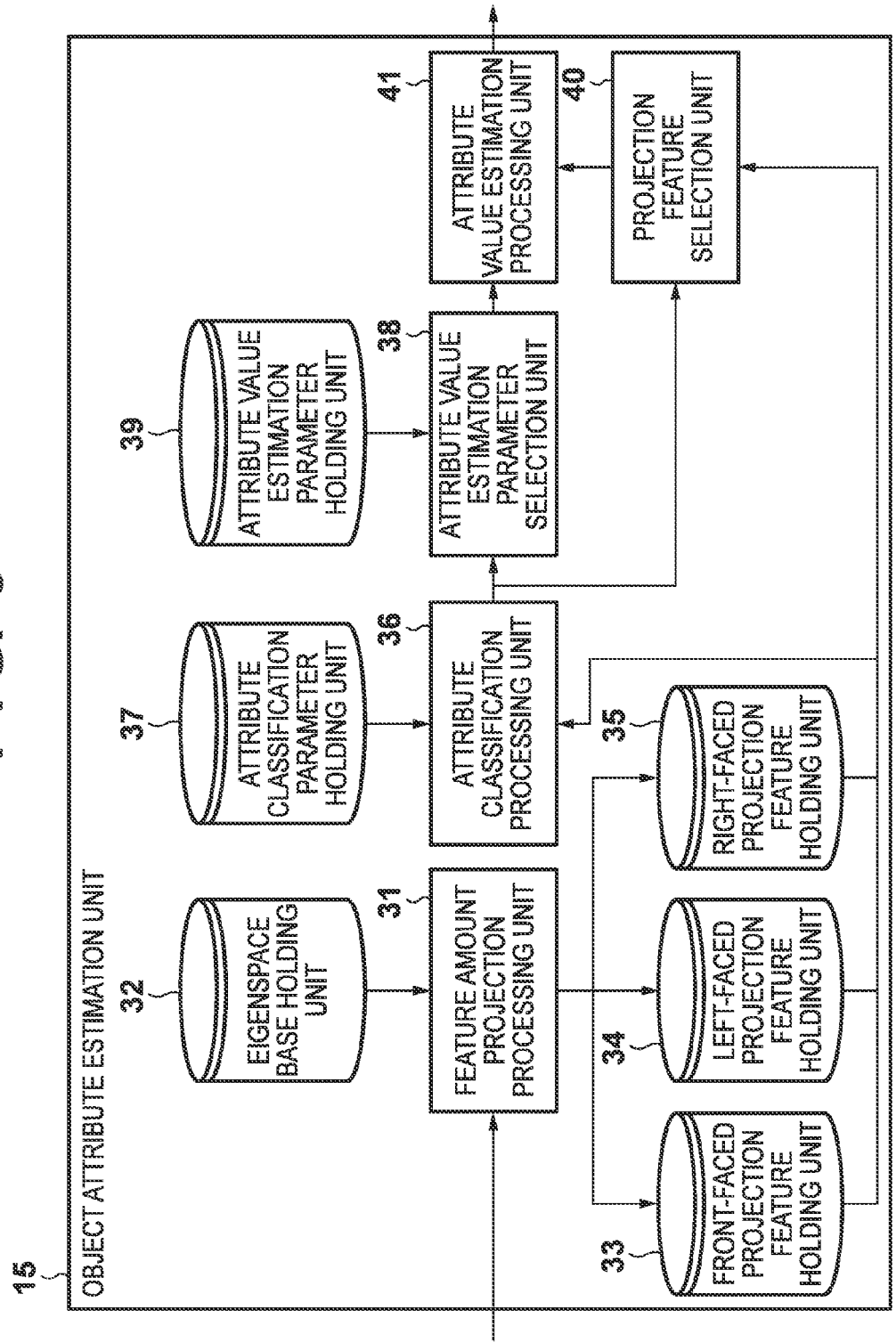
FIG. 5 is a block diagram showing an example of the functional arrangement of an object attribute estimation unit 15.

An example of the functional arrangement of the object attribute estimation unit 15 will be described below with reference to the block diagram shown in FIG. 5.

A feature amount projection processing unit 31 acquires a vector which represents the image feature amount obtained from the object feature amount extraction unit 14, and acquires three eigenspace bases, that is, a front-faced eigenspace base, left-faced eigenspace base, and right-faced eigenspace base, which are held by an eigenspace base holding unit 32. Then, the feature amount projection processing unit 31 executes processing for calculating projection vectors by projecting the vector which expresses the image feature amount obtained from the object feature amount extraction unit 14 respectively using these three eigenspace bases.

Figure 6:
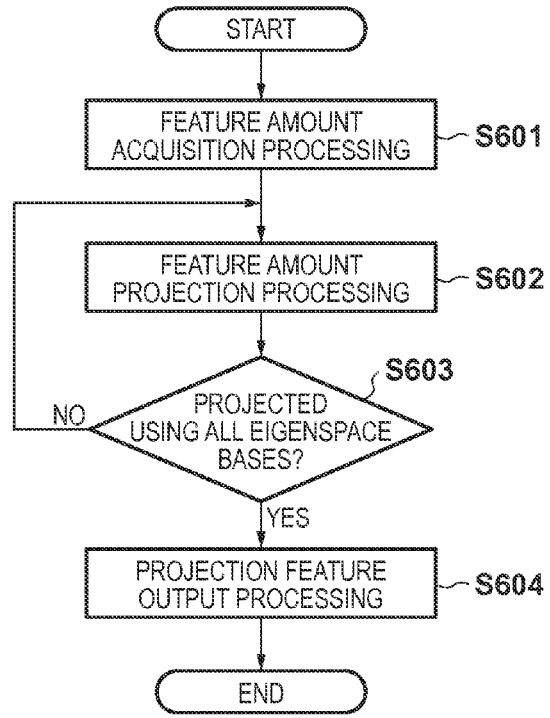
FIG. 6 is a flowchart of processing to be executed by a feature amount projection processing unit 31.

The processing to be executed by the feature amount projection processing unit 31 will be described below with reference to FIG. 6 which shows the flowchart of that processing.

In step S601, the feature amount projection processing unit 31 acquires the image feature amount output from the object feature amount extraction unit 14.

In step S602, the feature amount projection processing unit 31 reads out one of the three eigenspace bases held by the eigenspace base holding unit 32. A read-out order of the three eigenspace bases is not limited to a specific order. Then, the feature amount projection processing unit 31 projects the vector which expresses the image feature amount acquired in step S601 using the eigenspace base read out from the eigenspace base holding unit 32 onto an eigenspace (feature space) specified by the eigenspace base, thus calculating a projection vector.

Each individual eigenspace base is a base of a feature space which is calculated for each of a plurality of different prescribed states (different face directions in this case), and is prescribed by the image feature amount of a subject in the image including the subject having that prescribed state. More specifically, this eigenspace base is calculated in advance from a large number of face images as learning data using PCA (Principal Component Analysis).

Let X be the vector which expresses the image feature amount acquired in step S601, and X is defined by:

$$X = [x_1, x_2, x_3, \ldots, x_m]^T \quad (5)$$

where T is transposition, x is a component of the gradient direction histogram feature amount, and m is the number of dimensions of the image feature amount acquired in step S601. Also, let V be a projection matrix to the feature space which is specified by the eigenspace base read out from the eigenspace base holding unit 32, and V is defined by:

$$V = \begin{bmatrix} v_{11} & \cdots & v_{1m} \\ \vdots & \ddots & \vdots \\ v_{m1} & \cdots & v_{mm} \end{bmatrix} \quad (6)$$

Then, letting P be a projection vector (projection feature) as a projection result of the vector X using this projection matrix V, we have:

$$P_{all} = V \cdot (X - A) = [p_1, p_2, p_3, \ldots, p_m]^T \quad (7)$$

$$P = [p_1, p_2, p_3, \ldots, p_n]^T (n < m) \quad (8)$$

where A is an average vector of learning data. The PCA is a method of analyzing a distribution of a feature amount group, and calculating a base in a maximum scattered difference criterion, and can project the feature amount onto a space having a higher informational value (in the maximum scattered difference criterion) than the source feature space. By projecting the feature amount onto the eigenspace obtained by the PCA, not only an image set used in learning can be expressed better, but also an effect of reducing the number of dimensions of the feature amount can be expected. A dimension reduction amount can be set by adjusting a numerical value of n in equation (8). In this embodiment, n is experimentally set, but it may be set based on a cumulative contribution ratio.

Note that the eigenspace may be calculated using other methods. For example, other methods such as Locality Preserving Projection (LPP) and Local Fisher Discriminant Analysis (LFDA) as a supervised eigenspace learning method may be adopted.

The three eigenspace bases are respectively learned using predetermined face-direction ranges. More specifically, the left-faced eigenspace base is obtained by learning using a left-faced face image group. Also, the right-faced eigenspace base is obtained by learning using a right-faced face image group. Furthermore, the front-faced eigenspace base is obtained by learning using a front-faced face image group.

Figure 7:
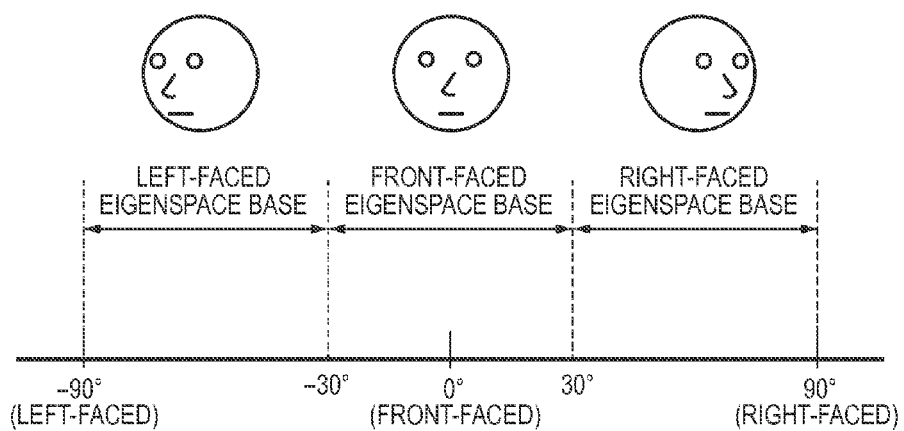
FIG. 7 is a view showing an example of face direction ranges of face images used to learn respective eigenspaces.

Examples of face-direction ranges of face images used in learning of the respective eigenspaces will be described with reference to FIG. 7. As shown in FIG. 7, assume that an angle of a face direction which faces the front (a direction of an image sensing device used to capture this image) is 0°, that of a direction which faces to the left when viewed from the image sensing device is a face-direction angle in a minus direction, and that of a direction which faces to the right is a face-direction angle in a plus direction. At this time, the front-faced eigenspace base is set in a range from −30° to 30°, the left-faced eigenspace base is a range from −90° to −30°, and the right-faced eigenspace base is set in a range from 30° to 90°. Of course, the face-direction angle ranges required to learn the respective bases are not limited to these ranges. The angle ranges are set so that appearances between images which belong to different angle ranges are largely different.

As a result of such learning, the eigenspaces specialized to respective face-direction ranges can be obtained rather than an eigenspace base learned using all face directions, and projection features which can express face-direction changes in more detail can be acquired within these ranges.

The feature amount is projected respectively using these eigenspace bases which are prepared in advance. According to equations (7) and (8), a projection vector $P_F$ projected using the front-faced eigenspace base, a projection vector $P_L$ projected using the left-faced eigenspace base, and a projection vector $P_R$ projected using the right-faced eigenspace base are respectively given by:

$$P_F = [pf_1, pf_2, pf_3, \ldots, pf_{n1}]^T \quad (9)$$

$$P_L = [pl_1, pl_2, pl_3, \ldots, pl_{n2}]^T \quad (10)$$

$$P_R = [pr_1, pr_2, pr_3, \ldots, pr_{n3}]^T \quad (11)$$

where n1, n2, and n3 are natural numbers which represent the numbers of dimensions of the corresponding projection vectors. By projecting one feature amount using different eigenspace bases like in this projection processing, different feature amounts can be acquired. That is, this projection processing is equivalent to extraction of different feature amounts from the image.

In this embodiment, the eigenspaces for approximately three face directions are prepared. Alternatively, eigenspaces may be prepared for finer face-direction ranges, or only eigenspaces for only two directions, that is, right and left directions may be prepared. However, as described above, an attribute used as a reference for this range is limited to that which can be digitized quantitatively or heuristically.

The feature amount projection processing unit 31 checks in step S603 whether or not the projection processing using the eigenspace bases for all the face directions held in the eigenspace base holding unit 32 is complete. As a result of this checking process, if the projection processing using the eigenspace bases for all the face directions is complete, the process advances to step S604; if the eigenspace bases to be used in the projection processing still remain, the process returns to step S602.

In step S604, the feature amount projection processing unit 31 holds the projection vector obtained by projection using the front-faced eigenspace base in the front-faced projection feature holding unit 33. The feature amount projection processing unit 31 holds the projection vector obtained by projection using left-faced eigenspace base in the left-faced projection feature holding unit 34. The feature amount projection processing unit 31 holds the projection vector obtained by projection using the right-faced eigenspace base in the right-faced projection feature holding unit 35.

In this way, in association with a plurality of prescribed states (three different face directions in this case), the feature amount projection processing unit 31 calculates projection vectors obtained by projecting a vector which expresses an image feature amount of an estimation target subject onto feature spaces prescribed by bases acquired for the respective prescribed states.

An attribute classification processing unit 36 executes processing for classifying within which face-direction range a direction of each face in the image falls using the projection vectors calculated for respective face directions by the feature amount projection processing unit 31. The processing to be executed by the attribute classification processing unit 36 will be described below with reference to FIG. 8 which shows the flowchart of that processing.

In step S801, the attribute classification processing unit 36 reads out the projection vectors respectively from a front-faced projection feature holding unit 33, left-faced projection feature holding unit 34, and right-faced projection feature holding unit 35.

In step S802, the attribute classification processing unit 36 generates a connected vector (connected projection feature) by connecting the three projection vectors read out in step S801. A connected vector $P_{CON}$ generated by connecting the three projection vectors $P_F$, $P_L$, and $P_R$ is expressed by:

$$P_{CON} = [pc_1, pc_2, pc_3, \ldots, pc_{3n}]^T \quad (12)$$
$$= [pf_1, \ldots, pf_n, pl_1, \ldots, pl_n, pr_1, \ldots, pr_n]^T$$

In step S803, the attribute classification processing unit 36 reads out attribute classification parameters held in an attribute classification parameter holding unit 37. These attribute classification parameters are learned in advance using data which associate the same face images as the face-direction angle ranges used in learning of the eigenspace bases shown in FIG. 7 with classification labels (front-faced, left-faced, and right-faced).

In step S804, the attribute classification processing unit 36 classifies the direction of each face in the image to one of "front-faced", "left-faced", and "right-faced" using the connected vector generated in step S802 and the attribute classification parameters read out in step S803. This classification uses a multi-class support vector machine (multi-class SVM).

In step S805, the attribute classification processing unit 36 outputs the classification result (classified attribute) in step S804 to a subsequent attribute value estimation parameter selection unit 38 and projection feature selection unit 40.

The attribute value estimation parameter selection unit 38 acquires, from an attribute value estimation parameter holding unit 39, an attribute value estimation parameter according to the classification result received from the attribute classification processing unit 36, and outputs the acquired attribute value estimation parameter to an attribute value estimation processing unit 41. Likewise, the projection feature selection unit 40 acquires the projection vector according to this classification result from one of the front-faced projection feature holding unit 33, left-faced projection feature holding unit 34, and right-faced projection feature holding unit 35, and outputs the acquired projection vector to the attribute value estimation processing unit 41.

For example, when the classification result is "front-faced", the attribute value estimation parameter selection unit 38 reads out a front-faced attribute value estimation parameter as a parameter required to estimate an angle of a front-faced face which faces to the front from the attribute value estimation parameter holding unit 39. Also, the projection feature selection unit 40 reads out the projection vector held in the front-faced projection feature holding unit 33.

When the classification result is "left-faced", the attribute value estimation parameter selection unit 38 reads out a left-faced attribute value estimation parameter as a parameter required to estimate an angle of a left-faced face which faces to the left from the attribute value estimation parameter holding unit 39. Also, the projection feature selection unit 40 reads out the projection vector held in the left-faced projection feature holding unit 34.

When the classification result is "right-faced", the attribute value estimation parameter selection unit 38 reads out a right-faced attribute value estimation parameter as a parameter required to estimate an angle of a right-faced face which faces to the right from the attribute value estimation parameter holding unit 39. Also, the projection feature selection unit 40 reads out the projection vector held in the right-faced projection feature holding unit 35.

The attribute value estimation processing unit 41 acquires the attribute value estimation parameter received from the attribute value estimation parameter selection unit 38, and builds an estimation model required to estimate an angle of the face. Then, the attribute value estimation processing unit 41 inputs the projection vector received from the projection feature selection unit 40 to the estimation model to calculate that estimation model, thereby estimating the angle of the face as an attribute value of the face. This estimation uses the SVR. The attribute value estimation parameter is a parameter of the SVR, which is leaned in advance using data which associates face images and integer values of that face direction.

Examples of face-direction ranges of face images used in learning of the SVR will be described with reference to FIG. 9. As shown in FIG. 9, each attribute value estimation parameter is learned using face images which overlap neighboring ranges. For example, a front-faced attribute value estimation parameter is learned using face images within a range from −45° to 45°, and a left-faced attribute value estimation parameter is learned using face images within a range from −100° to −15°. A range from −45° to −15° overlaps, and this range allows these two attribute value estimation parameters to estimate an angle. This is because since a face image around 30° as a boundary between left-faced and front-faced attribute classifications readily fails to be classified, even when it is erroneously classified to a neighboring range, an accuracy drop in angle estimation can be prevented.

This estimation model may use other recursive functions, or a plurality of 2-class identifiers are combined to artificially estimate a face-direction angle. The SVR maps the input projection vector onto an estimated face-direction angle (integer value). In this case, since the attribute value estimation parameter and input projection vector are selected according to the attribute classification result, detailed attribute estimation is allowed in association with the face-direction range of the classification result.

The attribute estimation result output unit 16 outputs the image stored in the image holding unit 12 and information indicating the angle value estimated by the attribute value estimation processing unit 41.

As described above, according to this embodiment, using projection features respectively projected in advance using the eigenspace bases for respective approximate face directions, attribute classification processing for classifying a face image into an approximate face direction, and attribute estimation using a projection feature and estimation model according to the classification result are executed. Since it is relatively easy to estimate (classify) an approximate face direction compared to estimation of a detailed face direction, accuracy improvement can be expected by detailed face direction estimation based on a relative accurate classification result. In addition, by selecting the estimation model corresponding to the classification result, a face direction within the classification result range can be estimated in more detail. Since the projection features are temporarily held, the attribute classification processing unit 36 and attribute value estimation processing unit 41 can use the common projection features, and calculation times and efforts required for feature extraction and projection processing can also be reduced.

This embodiment has explained the case in which a face direction is estimated. This embodiment is similarly applicable to a case in which directions of other objects such as a human body, animal face, and vehicle, thus expecting the same effects.

The above description has been given taking various practical examples. However, these examples are merely examples of the arrangement to be explained next, and this embodiment is merely an example of an embodiment which can be derived from the following arrangement.

An image feature amount is extracted from a region of an estimation target subject included in an input image. Furthermore, bases of feature spaces, which are calculated in advance in association with a plurality of attributes that are determined in advance as an attribute of a subject, and are prescribed by image feature amounts of the subject extracted from the image of the subject that belongs to these attributes, are acquired. Then, by projecting a vector indicating the image feature amount using the bases of the feature spaces calculated in advance for the attributes, projection vectors are calculated. Using the projection vectors respectively calculated for these plurality of attributes, the estimation target subject is classified into one of these plurality of attributes.

Of models used to estimate to which sub attribute of sub attributes, which are calculated in advance respectively for these plurality of attributes and are included in the attributes, the subject classified to the attribute belongs, a model which is calculated in advance for the classified attribute is selected as a selection model. Using this selection model, a sub attribute to which the estimation target subject belongs is estimated from the projection vectors calculated for the classified attribute.

[Second Embodiment]

This embodiment includes a plurality of object detectors each for detecting an object of a specific attribute, and executes attribute classification and attribute value estimation based on detection results of the respective detectors. For example, assume that a target object is a face of a person, and an attribute is an age of that person (face).

In the functional arrangement of an image processing apparatus according to this embodiment, the object detection unit 13, object feature amount extraction unit 14, and object attribute estimation unit 15 are respectively replaced by an attribute-dependent object detection unit 105, attribute-dependent feature amount extraction unit 106, and object attribute estimation unit 107. Only differences from the first embodiment will be described below, and a description of the same points as in the first embodiment will not be repeated.

Figure 10:
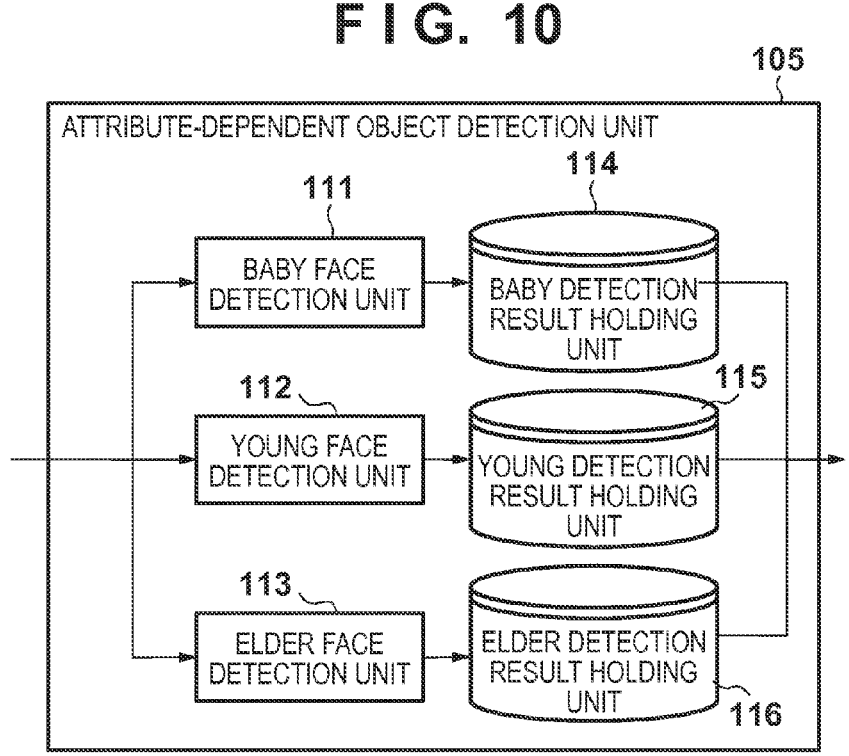
FIG. 10 is a block diagram showing an example of the functional arrangement of an attribute-dependent object detection unit 105.

An example of the functional arrangement of the attribute-dependent object detection unit 105 will be described first with reference to FIG. 10. The attribute-dependent object detection unit 105 executes face detection from an image acquired from the image holding unit 12 in the same manner as in the first embodiment, but it has face detectors for respective face types (a baby face, young face, and elder face in FIG. 10) unlike in the first embodiment.

A baby face detection unit 111 is a detector used to detect a human face, an age group of which corresponds to "baby". A young face detection unit 112 is a detector used to detect a human face, an age group of which corresponds to "young". An elder face detection unit 113 is a detector used to detect a human face, an age group of which corresponds to "elder". Each detector can use the face detection technique described in the first embodiment.

The baby face detection unit 111 executes face detection using a face detection parameter learned using face images corresponding to "baby". The young face detection unit 112 executes face detection using a face detection parameter learned using face images corresponding to "young". The elder face detection unit 113 executes face detection using a face detection parameter learned using face images corresponding to "elder".

Thus, an effect of a detection error reduction of human faces having different tendencies of appearances depending on age groups can be expected, and an age group can be classified based on outputs from the respective detectors. In this case, ages within a predetermined range are called an age group, and an age is an actual age of that person. In addition to an actual age, an age of a physical appearance of a face based on the human subjective view.

The baby face detection unit 111 stores region information of a rectangular region which surrounds a face region corresponding to "baby" in a baby detection result holding unit 114. The young face detection unit 112 stores region information of a rectangular region which surrounds a face region corresponding to "young" in a young detection result holding unit 115. The elder face detection unit 113 stores region information of a rectangular region which surrounds a face region corresponding to "elder" in an elder detection result holding unit 116.

The baby face detection unit 111, young face detection unit 112, and elder face detection unit 113 also store detection likelihoods $\sigma_{baby}$, $\sigma_{young}$, and $\sigma_{elder}$ respectively in addition to the region information. The likelihood for the region information may be set based on, for example, a degree of matching with the detection parameter, or may be set to be higher with increasing area of a region indicated by the region information. That is, the likelihood can be defined based on an arbitrary criterion. Note that the likelihoods $\sigma_{baby}$, $\sigma_{young}$, and $\sigma_{elder}$ are respectively calculated by the baby face detection unit 111, young face detection unit 112, and elder face detection unit 113. These respective pieces of stored information are output as needed in response to requests from the attribute-dependent feature amount extraction unit 106 and object attribute estimation unit 107.

Note that in this embodiment, age groups are divided into "baby", "young", and "elder", and the face detectors corresponding to the respective divided age groups are prepared. Alternatively, the number of face detectors may be reduced like "baby" and "others". Age groups may be further finely divided to increase the number of face detectors. However, as described above, when the number of face detectors is increased, since there is a demerit of increasing a dictionary file size, the number of face detectors has to be set in consideration of the total dictionary file size.

The attribute-dependent feature amount extraction unit 106 acquires the likelihoods $\sigma_{baby}$, $\sigma_{young}$, and $\sigma_{elder}$ of the detection results respectively from the baby detection result holding unit 114, young detection result holding unit 115, and elder detection result holding unit 116. Then, the attribute-dependent feature amount extraction unit 106 notifies the subsequent object attribute estimation unit 107 of the region information corresponding to the likelihood equal to or higher than a threshold of those stored in the baby detection result holding unit 114, young detection result holding unit 115, and elder detection result holding unit 116. For example, when only the likelihood $\sigma_{baby}$ of the three likelihoods is lower than the threshold, the attribute-dependent feature amount extraction unit 106 reads out the corresponding pieces of region information from the young detection result holding unit 115 and elder detection result holding unit 116 and outputs them to the subsequent object attribute estimation unit 107.

Figure 11:
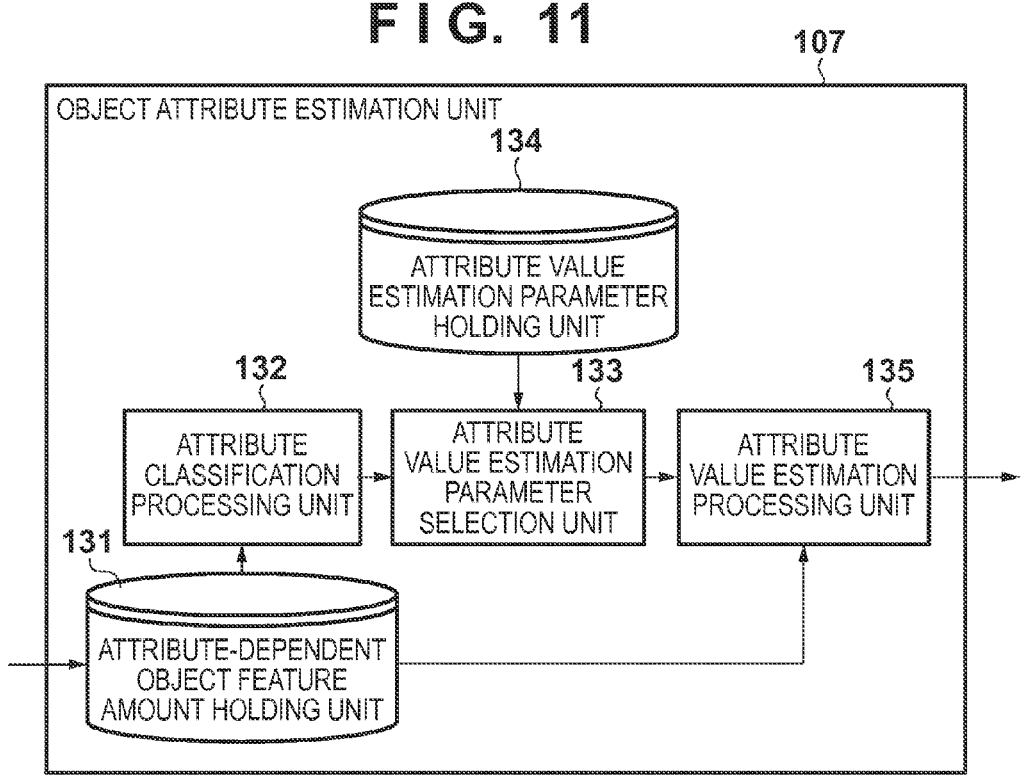
FIG. 11 is a block diagram showing an example of the functional arrangement of an object attribute estimation unit 107.

An example of the functional arrangement of the object attribute estimation unit 107 will be described below with reference to the block diagram shown in FIG. 11. An attribute-dependent object feature amount holding unit 131 holds region information output from the attribute-dependent feature amount extraction unit 106.

Figure 12:
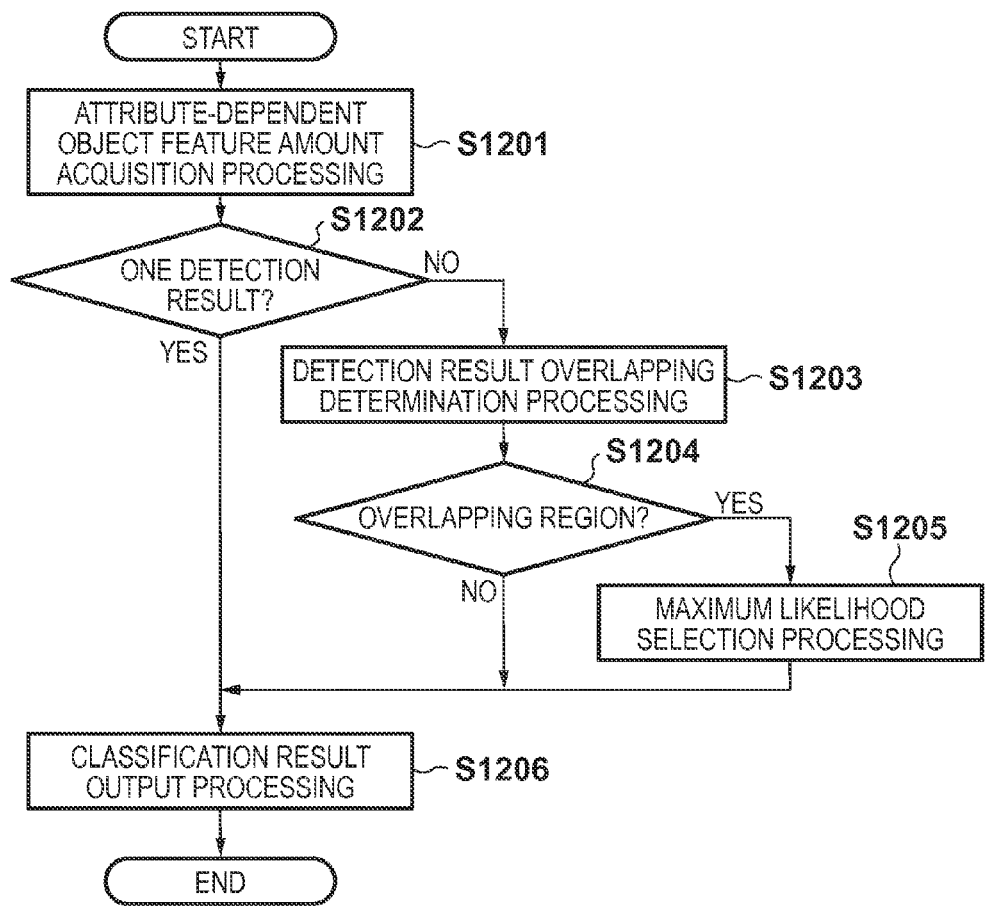
FIG. 12 is a flowchart of processing to be executed by an attribute classification processing unit 132.

An attribute classification processing unit 132 finally classifies one or more faces in an image into any of "baby", "young", and "elder" based on the region information stored in the attribute-dependent object feature amount holding unit 131. Processing to be executed by the attribute classification processing unit 132 will be described below with reference to FIG. 12 which shows the flowchart of that processing.

In step S1201, the attribute classification processing unit 132 acquires the region information from the attribute-dependent object feature amount holding unit 131.

The attribute classification processing unit 132 checks in step S1202 whether or not one piece of region information is acquired in step S1201. The case in which only one piece of region information is acquired corresponds to a case in which the remaining two face detectors do not detect any face, or no information is stored in the attribute-dependent object feature amount holding unit 131 due to a low likelihood. As a result of this checking process, if only one piece of region information is acquired, the process advances to step S1206. On the other hand, if two or more pieces of region information are acquired, the process advances to step S1203.

If the process advances from step S1202 to step S1206, and if a detection source of this one piece of region information is the baby face detection unit 111, the attribute classification processing unit 132 outputs information indicating "baby" as a classification result to the object attribute estimation unit 107 in step S1206. If the detection source is the young face detection unit 112, the attribute classification processing unit 132 outputs information indicating "young" as a classification result to the object attribute estimation unit 107. If the detection source is the elder face detection unit 113, the attribute classification processing unit 132 outputs information indicating "elder" as a classification result to the object attribute estimation unit 107.

On the other hand, the attribute classification processing unit 132 checks in step S1203 whether or not regions indicated by the two or more pieces of region information have an overlapping portion. Since a region on an image can be specified based on region information, it is easy to specify regions corresponding to respective pieces of region information and to specify an overlapping portion between the specified regions. Note that in this embodiment, when an area S of the overlapping portion is larger than a threshold θ, it is judged that "regions have an overlapping portion". However, this criterion is not limited to a specific criterion.

If it is judged in step S1203 that regions have an overlapping portion, the process advances to step S1205 via step S1204; otherwise, the process advances to step S1206 via step S1204.

If the process advances to step S1206 via step S1204, the attribute classification processing unit 132 outputs information indicating a classification result corresponding to the detection source of the each of two or more pieces of region information to the object attribute estimation unit 107 in step S1206. For example, when the detection sources of the two or more pieces of region information are respectively the baby face detection unit 111 and young face detection unit 112, the attribute classification processing unit 132 outputs information indicating "baby" and that indicating "young" as classification results to the object attribute estimation unit 107.

On the other hand, in step S1205, the attribute classification processing unit 132 acquires likelihoods for the respective pieces of region information of regions judged to have an overlapping portion from holding units which hold the likelihoods, and specifies a highest one of the acquired likelihoods. Then, the attribute classification processing unit 132 outputs information indicating a classification result corresponding to the detection source of the region information, which corresponds to the specified likelihood, to the object attribute estimation unit 107.

Figure 13:
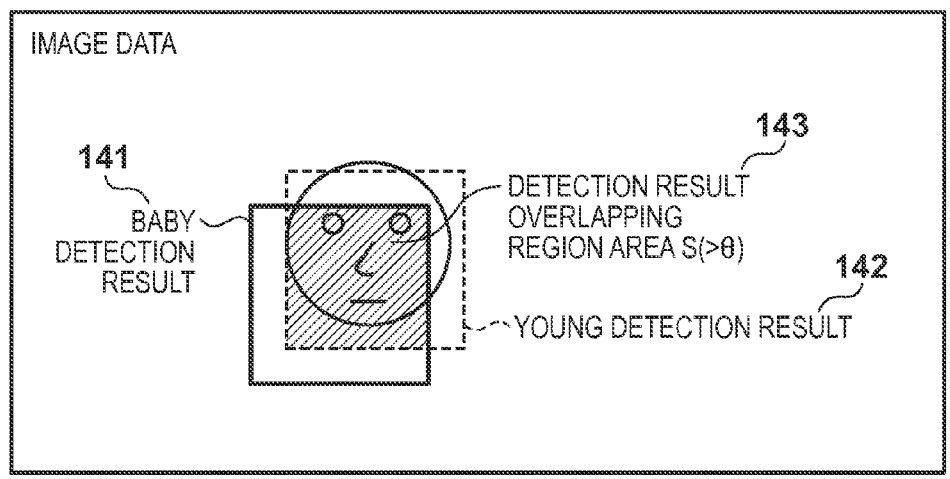
FIG. 13 is a view for explaining overlapping of regions.

For example, as shown in FIG. 13, an area S of an overlapping portion 143 between a region 141 indicated by region information detected by the baby face detection unit 111 and a region 142 indicated by region information detected by the young face detection unit 112 is larger than the threshold θ. Therefore, in this case, the process of step S1205 is executed. Then, the likelihoods $\sigma_{baby}$ and $\sigma_{young}$ are compared in step S1205, and a higher likelihood is selected. Then, after that, in step S1206, the attribute classification processing unit 132 outputs information indicating a classification result corresponding to the detection source of region information, which corresponds to this selected likelihood, to the object attribute estimation unit 107. Note that when the selected likelihood is smaller than a certain threshold, no detection result may be determined.

An attribute value estimation parameter selection unit 133 acquires an attribute value estimation parameter according to the classification result received from the attribute classification processing unit 132 from an attribute value estimation parameter holding unit 134, and outputs the acquired attribute value estimation parameter to an attribute value estimation processing unit 135. For example, when a classification result "baby" is received from the attribute classification processing unit 132, the attribute value estimation parameter selection unit 133 acquires an attribute value estimation parameter required to estimate an age of "baby".

The attribute value estimation processing unit 135 calculates an image feature amount from a region indicated by region information corresponding to the classification result, and calculates a projection vector using an eigenspace base corresponding to an attribute classified by the attribute classification processing unit 132 in the same manner as in the first embodiment. Then, the attribute value estimation processing unit 135 estimates an age by executing the same processing as in the first embodiment using the projection vector of the attribute classified by the attribute classification processing unit 132 and the attribute value estimation parameter received from the attribute value estimation parameter selection unit 133.

In this manner, when a plurality of detectors each of which is used to detect a specific object are prepared, and classification is done based on their detection results, classification processing can be implemented without preparing for dedicated classifiers required to classify an age group. As in the face-direction estimation, the appearance of a human face largely changes according to an age group. For this reason, in order to estimate an age from a face image in detail, more accurate age estimation is expected by preparing for age group-dependent models and selecting an estimation model corresponding to a face image in place of preparing for an estimation model (learning parameters) common to all age groups. As an arrangement for implementing age estimation of a human face, that including one object detector and classifiers used to classify a face for respective predetermined attributes may be adopted like in the first embodiment.

As for a face, other attributes may be estimated. For example, an open/close degree of an eye or mouth may be digitalized, predetermined numerical value ranges may be set, and the open/close degrees may be classified for respective numerical value ranges, thereby estimating attribute values in detail using models according to classification results. In addition, when quantitatively or heuristically determined numerical values may be assigned as attribute values in association with degrees of complexion, beard thickness, smile degree, and the like, the same processing as in this embodiment may be applied to estimate attribute values in detail. With this method, an effect can be expected when an attribute such as a direction of a vehicle, animal, or the like other than a face or an age or smile degree other than a direction is estimated.

Note that the first and second embodiments adopt different methods of classifying an attribute of a subject, but the classification method described in one embodiment may be used in the other embodiment. That is, the techniques respectively described in the first and second embodiments may be combined as needed or may be partially replaced between the embodiments.

[Third Embodiment]

Figure 1:
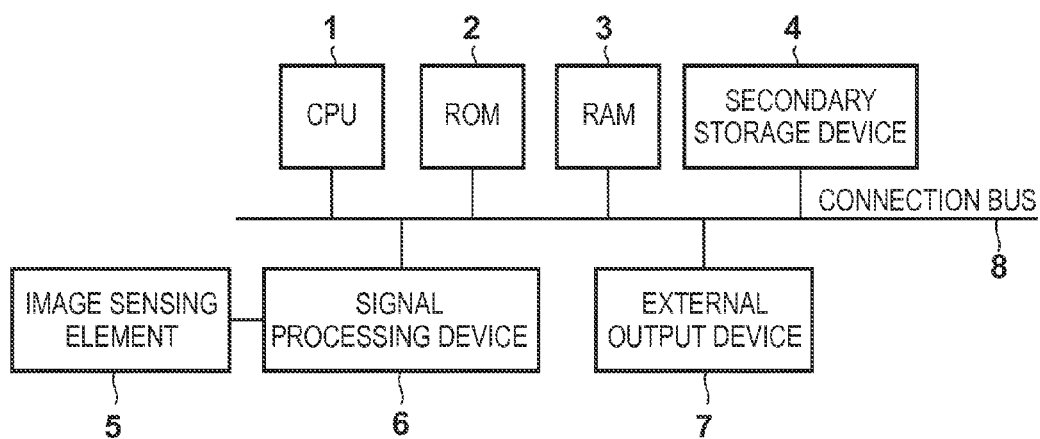
FIG. 1 is a block diagram showing an example of the hardware arrangement of a computer.

The respective units shown in FIGS. 2, 4, 5, 10, and 11 may be implemented as hardware. Alternatively, components described as "holding units" may be implemented by a memory, and the remaining units may be implemented by computer programs. In this case, a computer having the arrangement shown in FIG. 1 is applicable to the aforementioned image processing apparatus.

A CPU 1 executes operation control of the overall computer by executing processing using computer programs and data stored in a ROM 2 and RAM 3, and executes the aforementioned processes described above as those to be implemented by the image processing apparatus to which this computer is applied.

The ROM 2 stores setting data, a boot program, and the like of this computer. The RAM 3 has an area used to temporarily store computer programs and data loaded from a secondary storage device 4, and an area used to temporarily store data of images input via a signal processing device 6. Furthermore, the RAM 3 has a work area used when the CPU 1 executes various kinds of processing. That is, the RAM 3 can provide such various areas as needed.

The secondary storage device 4 is a large-capacity information storage device represented by a hard disk drive or the like. The secondary storage device 4 saves an OS (Operating System), and computer programs for controlling the CPU 1 to implement functions of the respective units other than the holding units of those shown in FIGS. 2, 4, 5, 10, and 11. Also, data described as those to be held by the holding units can be saved in this secondary storage device 4. Computer programs and data saved in the secondary storage device 4 are loaded onto the RAM 3 as needed under the control of the CPU 1, and are to be processed by the CPU 1.

An image sensing element 5 includes a CCD sensor, CMOS sensor, or the like, and is included in a digital camera. This image sensing element 5 converts light of the external world into an electrical signal (image signal), and outputs the converted image signal to the signal processing device 6.

The signal processing device 6 generates image data from the image signal received from the image sensing element 5, and outputs the generated image data to the RAM 3 or secondary storage device 4. Note that an arrangement for inputting an image to this computer is not limited to this, and various other arrangements may be adopted.

An external output device 7 includes a display device, a network interface required to connect an external network, or the like. When the external output device 7 is a display device, this display device includes a CRT, liquid crystal panel, or the like, and can display processing results of this computer by images, characters, and the like. For example, the display device may display a result output from the attribute estimation result output unit 16. When the external output device 7 is a network interface, the network interface may output result output from the attribute estimation result output unit 16 to an external apparatus via a network. This network may be either a wireless or wired network, or may include both the networks.

A connection bus 8 is connected to the CPU 1, ROM 2, RAM 3, secondary storage device 4, signal processing device 6, and external output device 7, and these units can communicate with each other via this connection bus 8.

Note that the arrangement shown in FIG. 1 may be that of a general PC (personal computer) or that of a digital camera. When the arrangement shown in FIG. 1 is that of a general PC, the image sensing element 5 and signal processing device 6 may be omitted. In this manner, the arrangement shown in FIG. 1 is applicable to various devices.

Note that when the respective units shown in FIGS. 2, 4, 5, 10, and 11 are implemented by hardware, a dedicated circuit (ASIC), processor (reconfigurable processor, DSP, CPU), and the like can be used as the hardware.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-266278 filed Dec. 5, 2011, which is hereby incorporated by reference herein in its entirety.

What is claimed is:

1. An image processing apparatus comprising:
a detection unit configured to detect a region of a face of a person from an input image;

an extraction unit configured to extract an image feature amount from the region of the face;

a projection unit configured to generate a plurality of projected feature vectors by projecting a feature vector indicating the image feature amount onto each of a plurality of feature spaces corresponding to plural ranges of directions of a face;

a classification unit configured to classify a direction of the face into one of the plural ranges of directions based on the plurality of projected feature vectors;

a vector selection unit configured to select one of the plurality of projected feature vectors corresponding to the classified range of directions of the face; and an estimation unit configured to estimate, based on the selected one of the projected feature vectors and a model corresponding to the classified range of directions of the face, a detailed direction of the face belonging to the classified range of directions.

2. The apparatus according to claim 1, wherein said projection unit comprises:

an acquisition unit configured to acquire bases of feature spaces defined by image feature amounts of faces which respectively belong to the plural ranges of directions; and a unit configured to calculate, for each of the plural ranges of directions, the projected feature vector by projecting the feature vector onto the feature space, using the base of the feature space.

3. The apparatus according to claim 1, further comprising a parameter selection unit configured to select a model parameter corresponding to the classified range of directions, from a plurality of model parameters which are provided in advance for the plural ranges of directions; and wherein said estimation unit utilizes the selected model parameter to determine the model correspondence to the classified range of directions.

4. The apparatus according to claim 2, wherein said acquisition unit acquires bases of feature spaces, which are calculated in advance for respective directions of the face, and are specified by image feature amounts of the face extracted from images of the face in the directions.

5. The apparatus according to claim 3, wherein said parameter selection unit selects a model parameter which is calculated in advance for a direction into which said classification unit classifies the face, from a plurality of model parameters which are calculated in advance for directions of the face, and are required to estimate which angle a face classified to the direction faces.

6. The apparatus according to claim 1, wherein said classification unit executes the classification using a support vector machine.

7. An image processing method comprising:

a detection step of detecting a region of a face of a person from an input image;

an extraction step of extracting an image feature amount from the region of the face;

a projection step of generating a plurality of projected feature vectors by projecting a feature vector indicating the image feature amount onto each of a plurality of feature spaces corresponding to plural ranges of directions of a face;

a classification step of classifying a direction of the face into one of the plural ranges of directions based on the plurality of projected feature vectors;

a vector selection step of selecting one of the plurality of projected feature vectors corresponding to the classified range of directions of the face; and an estimation step of estimating, based on the selected one of the projected feature vectors and a model corresponding to the classified range of directions of the face, a detailed direction of the face belonging to the classified range of directions.

8. A non-transitory computer-readable storage medium storing a program for controlling a computer to function as:

a detection unit configured to detect a region of a face of a person from an input image;

an extraction unit configured to extract an image feature amount from the region of the face;

a projection unit configured to generate a plurality of projected feature vectors by projecting a feature vector indicating the image feature amount onto each of a plurality of feature spaces corresponding to plural ranges of directions of a face;

a classification unit configured to classify a direction of the face into one of the plural ranges of directions based on the plurality of projected feature vectors;

a vector selection unit configured to select one of the plurality of projected feature vectors corresponding to the classified range of directions of the face; and an estimation unit configured to estimate, based on the selected one of the projected feature vectors and a model corresponding to the classified range of directions of the face, a detailed direction of the face belonging to the classified range of directions.

* * * * *